United States Patent
Yamanaka et al.

(10) Patent No.: US 10,042,645 B2
(45) Date of Patent: Aug. 7, 2018

(54) METHOD AND APPARATUS FOR COMPILING A PROGRAM FOR EXECUTION BY A PLURALITY OF PROCESSING UNITS

(71) Applicant: FUJITSU LIMITED, Kawasaki-shi, Kanagawa (JP)

(72) Inventors: Masanori Yamanaka, Chigasaki (JP); Masatoshi Haraguchi, Fuji (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 15/140,939

(22) Filed: Apr. 28, 2016

(65) Prior Publication Data

US 2016/0335084 A1 Nov. 17, 2016

(30) Foreign Application Priority Data

May 12, 2015 (JP) .................................. 2015-097583

(51) Int. Cl.
*G06F 9/45* (2006.01)
*G06F 9/38* (2018.01)

(52) U.S. Cl.
CPC ...................... *G06F 9/38* (2013.01)

(58) Field of Classification Search
CPC .................................................. G06F 9/3001
See application file for complete search history.

(56) References Cited

U.S. PATENT DOCUMENTS

| 5,088,034 | A | * | 2/1992 | Ihara | .................. G06F 8/45 717/146 |
| 2003/0182589 | A1 | | 9/2003 | Tani | |
| 2006/0101464 | A1 | * | 5/2006 | Dohrmann | ............ G06F 9/5066 718/100 |
| 2014/0101641 | A1 | * | 4/2014 | Staples | .................. G06F 8/456 717/130 |

FOREIGN PATENT DOCUMENTS

| JP | 2003-296123 | 10/2003 |
| JP | 2009-146243 | 7/2009 |
| JP | 2011-164758 | 8/2011 |

OTHER PUBLICATIONS

"Configuration and Optimization of Compiler", Asakura Publishing Co., Ltd. First Impression Ver. 1, 1999, 6 pages ( with English Translation).

* cited by examiner

*Primary Examiner* — Hang Pan
(74) *Attorney, Agent, or Firm* — Oblon, McClelland, Maier & Neustadt, L.L.P.

(57) ABSTRACT

A method of compiling a first program to output a second program, the method includes: determining a number of arithmetic units to be operated during execution of the second program for each of a plurality of sections in the first program; and creating the second program by adding an instruction to specify the number of arithmetic units to be operated to each of the plurality of sections based on the determining.

20 Claims, 20 Drawing Sheets

FIG. 5

| LOOP IDENTIFIER | LOOP IDENTIFIER OF MASTER LOOP | OPTIMIZATION STATE |
|---|---|---|
| 0 | NONE | IMPOSSIBLE |
| 1 | 0 | COMPLETE (NUMBER OF ARITHMETIC UNITS = s) |
| 2 | 0 | IMPOSSIBLE |
| 3 | 2 | COMPLETE (NUMBER OF ARITHMETIC UNITS = t) |
| 4 | 2 | IMPOSSIBLE |
| ⋮ | ⋮ | ⋮ |

FIG. 7

| | | MEMORY | MEMORY | ARITHMETIC UNIT | ARITHMETIC UNIT |
|---|---|---|---|---|---|
| | 1 | Load r1,A | Load r2,C | | |
| | 2 | | | | |
| CLOCK CYCLE | 3 | | | | |
| | 4 | Load r3,B | | Add r1,r1,5 | Add r2,r2,1 |
| | 5 | | | | |
| | 6 | | | | |
| | 7 | Store r2,C | | Add r1,r1,r3 | |
| | 8 | | | | |
| | 9 | | | | |
| | 10 | Store r1,A | | Mult r1,r1,r2 | |
| | 11 | | | | |
| | 12 | | | | |
| | 13 | Store r1,D | | | |

FIG. 9

```
FexecUnit, Off, 2

Load r1, a[i-1]
Load r2, b[i]
Fadd r1, r2, r2
Load r3, c[i]
Fadd r1, r1, r2
Fadd r1, r1, r3
Store Add i, i, 1

FexecUnit, On, 2
```

FIG. 12

```
for (i=1; i<N; i++) {
...
}

!loop priority performance
for (j=1; j<M; j++) {
  for (i=1; i<N; i++) {
...
  }
} for (j=1; j<M; j++) {
...
}
```

FIG. 14

| MODE | COMBINATION OF E AND F |
|---|---|
| POWER SAVING MODE 1 | E=5,F=10 |
| POWER SAVING MODE 2 | E=10,F=20 |

FIG. 16

```
for ( i=1; i<N; i++) {
  a[i]=a[i-1]+b[i]+c[i];
}
```

FIG. 17

| | MEMORY | INTEGER ARITHMETIC UNIT | FLOATING POINT ARITHMETIC UNIT |
|---|---|---|---|
| 1 | Load r1,a[i-1] | | |
| 2 | Load r2,b[i] | | |
| 3 | | | |
| 4 | Load r3,c[i] | | |
| 5 | | | Fadd r1,r1,r2 |
| 6 | | | |
| 7 | | | Fadd r1,r1,r3 |
| 8 | | | |
| 9 | | | |
| 10 | Store r1,a[i] | | |
| 11 | | Add i,i,1 | |

FIG. 18

```
for ( i=1; i<N; i++) {
  x[i]=a[i]+b[i]+c[i]*d[i];
  y[i]=a[i]*b[i]+c[i]+d[i];
}
```

FIG. 19

| | MEMORY | INTEGER ARITHMETIC UNIT | FLOATING POINT ARITHMETIC UNIT |
|---|---|---|---|
| 1 | Load r1,a[j] | | |
| 2 | Load r2,b[j] | | |
| 3 | | | |
| 4 | Load r3,c[j] | | |
| 5 | Load r4,d[j] | | |
| 6 | | | Fadd r5,r1,r2 |
| 7 | | | |
| 8 | | | Fmult r6,r3,r4 |
| 9 | | | Fmult r1,r1,r2 |
| 10 | | | Fadd r5,r5,r6 |
| 11 | | | Fadd r3,r3,r4 |
| 12 | | | Fadd r1,r1,r3 |
| 13 | Load r5,x[j] | | |
| 14 | | | |
| 15 | | | |
| 16 | Load r1,y[j] | | |
| 17 | | Add j,j,1 | |

FIG. 20

| | MEMORY | INTEGER ARITHMETIC UNIT | FLOATING POINT ARITHMETIC UNIT |
|---|---|---|---|
| 1 | Load r1,a[i] | | |
| 2 | Load r2,b[i] | | |
| 3 | | | |
| 4 | Load r3,c[i] | | Fadd r5,r1,r2 |
| 5 | Load r4,d[i] | | |
| 6 | | | |
| 7 | | | Fmult r6,r3,r4 |
| 8 | | | |
| 9 | | | |
| 10 | | | Fmult r1,r1,r2 |
| 11 | | | |
| 12 | | | |
| 13 | | | Fadd r5,r5,r6 |
| 14 | | | |
| 15 | | | |
| 16 | | | Fadd r3,r3,r4 |
| 17 | | | |
| 18 | | | |
| 19 | Store r5,x[i] | | Fadd r1,r1,r3 |
| 20 | | | |
| 21 | | | |
| 22 | | Add,i,i,1 | |
| 23 | Store r1,y[i] | | |

METHOD AND APPARATUS FOR COMPILING A PROGRAM FOR EXECUTION BY A PLURALITY OF PROCESSING UNITS

CROSS-REFERENCE TO RELATED APPLICATION

This application is based upon and claims the benefit of priority of the prior Japanese Patent Application No. 2015-097583, filed on May 12, 2015, the entire contents of which are incorporated herein by reference.

FIELD

The embodiments discussed herein are related to a compiling technique.

BACKGROUND

A technique is known for reducing power consumption by optimization by compiling (called as compiler optimization). For example, according to a related technique, an analysis device detects an operation resource which will not operate in an instruction section of a predetermined length when a microprocessor is in operation, and creates power control direction data. Then, with reference to the power control direction data, an adder device adds information for power control to: an instruction sequence which causes the microprocessor to operate; or a machine language instruction sequence created by translating the instruction sequence into the machine language. However, the related technique is based on the assumption that there is a state where an operation resource is not in operation in an instruction section of a predetermined length, and does not reduce power consumption in the case where such a state does not occur.

According to another related technique, power consumption is reduced as follows. A compiler of a very long instruction word (VLIW) type processor includes an interface configured to receive input of a power control compile option that gives a direction to change an arithmetic unit used in each slot and performs optimization according to a directed change of the arithmetic unit. The related technique is also based on the assumption that there is a state where the arithmetic unit is not in operation for a predetermined period of time.

For example, as examples of related art, Japanese Laid-open Patent Publication Nos. 2003-296123 and 2011-164758 are known.

SUMMARY

According to an aspect of the invention, a method of compiling a first program to output a second program, the method includes: determining a number of arithmetic units to be operated during execution of the second program for each of a plurality of sections in the first program; and creating the second program by adding an instruction to specify the number of arithmetic units to be operated to each of the plurality of sections based on the determining.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 5 illustrates an example of data stored into an optimization table storage unit;
FIG. 7 illustrates an example of a scheduling result;
FIG. 9 illustrates an example of a program stored into an optimization program storage unit;
FIG. 12 illustrates an example of data for specifying a loop which is given priority for performance;
FIG. 14 illustrates an example of a threshold value of an increase rate and a threshold value of a decrease rate;
FIG. 16 illustrates an example of a source program;
FIG. 17 illustrates an example of the scheduling result;
FIG. 18 illustrates an example of the source program;
FIG. 19 illustrates an example of the scheduling result;
and
FIG. 20 illustrates an example of the scheduling result.

DESCRIPTION OF EMBODIMENTS

According to an aspect of a present embodiment, it is an object of the present embodiment to provide a novel technique for reducing power consumption by compiler optimization.

[First Embodiment]

Figure 1:
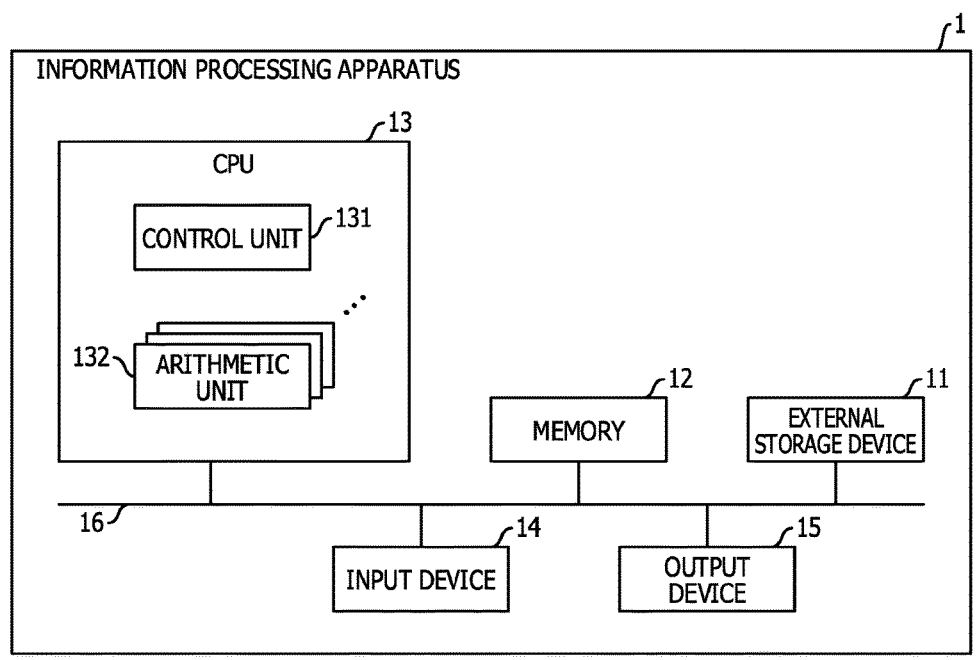
FIG. 1 illustrates a hardware configuration diagram of an information processing apparatus.

FIG. 1 illustrates a hardware configuration diagram of an information processing apparatus 1 according to the present embodiment. The information processing apparatus 1 includes an external storage 11, a memory 12, a central processing unit (CPU) 13, an input device 14, an output device 15, and a bus 16. The external storage 11 is, for example, a hard disk drive (HDD). The memory 12 is, for example, a main memory. The CPU 13 includes a control unit 131 and a plurality of arithmetic units 132. The plurality of arithmetic units 132 include an integer arithmetic unit and a floating point arithmetic unit. The input device 14 is, for example, a mouse or a keyboard. The output device 15 is, for example, a display.

Figure 2:
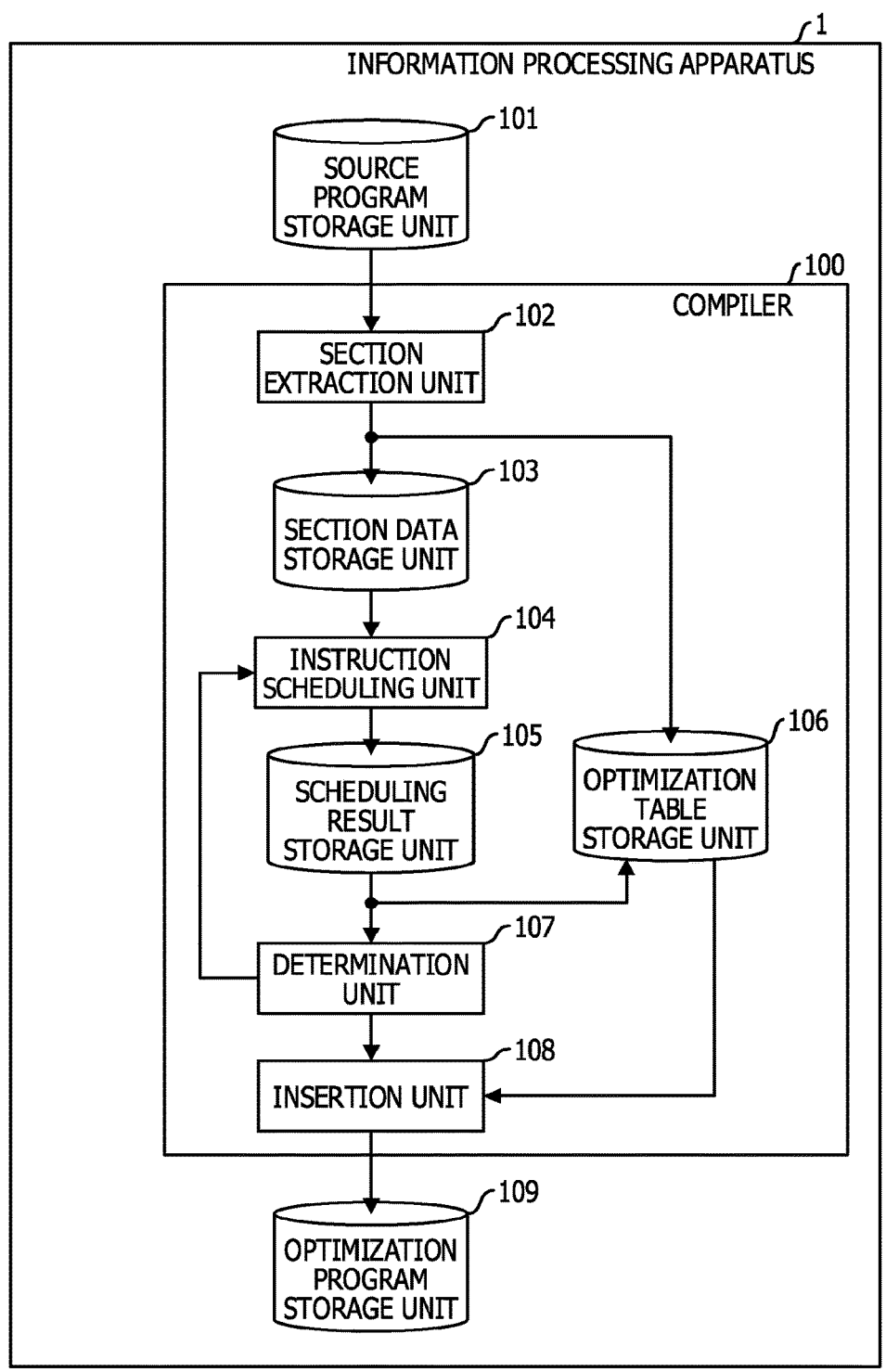
FIG. 2 illustrates a functional block diagram of the information processing apparatus according to a first embodiment.

FIG. 2 illustrates a functional block diagram of the information processing apparatus 1 according to a first embodiment. The information processing apparatus 1 includes a compiler 100, a source program storage unit 101 and an optimization program storage unit 109. The compiler 100 includes a section extraction unit 102, a section data storage unit 103, an instruction scheduling unit 104, a scheduling result storage unit 105, an optimization table storage unit 106, a determination unit 107, and an insertion unit 108.

The source program storage unit 101 stores a source program to be compiled. The section extraction unit 102 executes a processing based on a source program stored in the source program storage unit 101 and stores the processing result into the section data storage unit 103 and the optimization table storage unit 106. The instruction scheduling unit 104 executes a processing based on data stored in the section data storage unit 103, and stores the processing result into the scheduling result storage unit 105. The determination unit 107 executes a processing based on data stored in the scheduling result storage unit 105 and updates data stored in the optimization table storage unit 106 based on the processing result. The insertion unit 108 executes a processing based on data stored in the optimization table storage unit 106 and data received from the determination unit 107 and stores the processing result into the optimization program storage unit 109.

Note that the program stored in the optimization program storage unit 109 stores an optimized instruction sequence. The optimized instruction sequence is, for example, an intermediate representation program (or intermediate code) which is to be converted to an object program (or object code), and is finally converted to the object program and executed by the CPU 13. However, after executing a processing for converting the optimized instruction sequence to the object program by the compiler 100, the object program may be stored into the optimization program storage unit 109. Description of the processing for converting into the object program is omitted as not being a major part of this embodiment.

A program for implementing the compiler 100 according to the present embodiment is stored in the external storage 11. The CPU 13 executes the program stored in the external storage 11 by loading into the memory 12.

Figure 3:
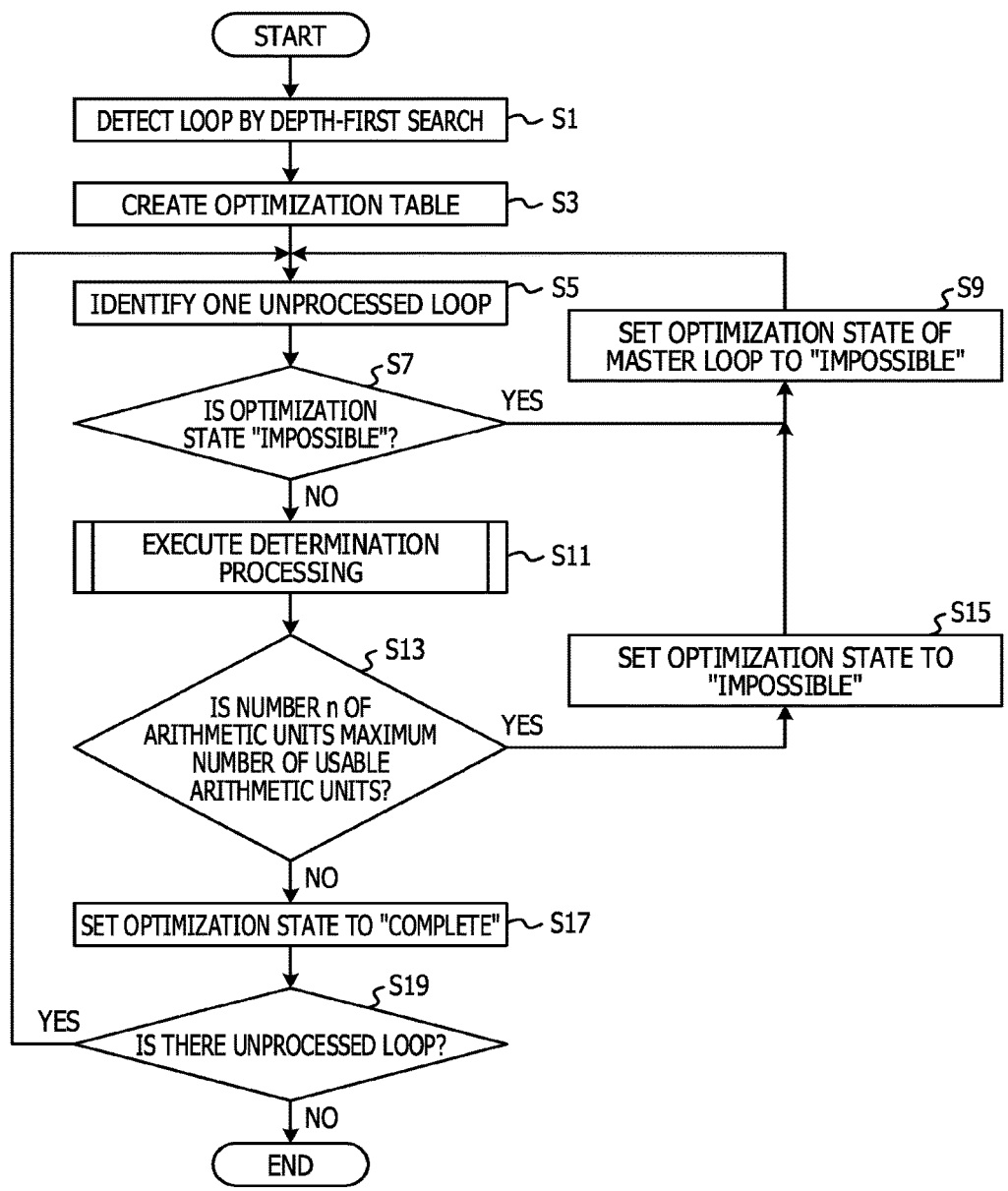
FIG. 3 illustrates a main processing flow.

Next, a processing executed by the information processing apparatus 1 is described with reference to FIGS. 3 to 9. FIG. 3 illustrates a main processing flow.

Figure 4:
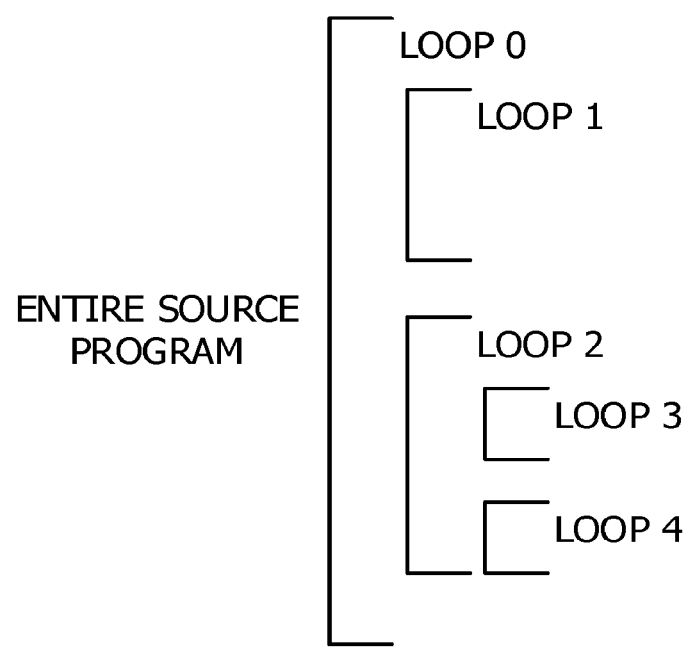
FIG. 4 illustrates an example of a loop extraction.

The section extraction unit 102 extracts a loop from a source program stored in the source program storage unit 101 by depth-first search (FIG. 3: step S1), and stores data related to the loop into the section data storage unit 103. Data related to the loop includes, for example, data related to the starting line and the ending line of each loop. FIG. 4 illustrates an example of the loop extraction. In the example of FIG. 4, loops 0 to 4 are extracted from the entire source program. The loop 2 is a master loop of the loops 3 and 4. The loop 0 is a master loop of the loops 1 and 2. The source program is handled as a loop iterated only once, and a loop identifier "0" is assigned to the source program.

The section extraction unit 102 creates the optimization table based on the processing result of the step S1 (step S3), and stores the optimization table into the optimization table storage unit 106. FIG. 5 illustrates an example of data stored into the optimization table storage unit 106. In the example of FIG. 5, a loop identifier, an identifier of the master loop and data indicating the optimization state are stored. "incomplete" is initially stored in the field where data indicating optimization state is stored.

When the processing result of the step S1 is stored into the optimization table, the determination unit 107 identifies one unprocessed loop from the optimization table storage unit 106 (step S5).

The determination unit 107 determines whether the optimization state of the identified loop (hereinafter referred to as a target loop) is "impossible" (step S7). When the optimization state is "impossible" (step S7: Yes), the determination unit 107 identifies a master loop of the target loop from the optimization table storage unit 106. Then, the determination unit 107 sets the optimization state of the identified master loop to "impossible" (step S9). Then, the process returns to the processing of the step S5.

Figure 6:
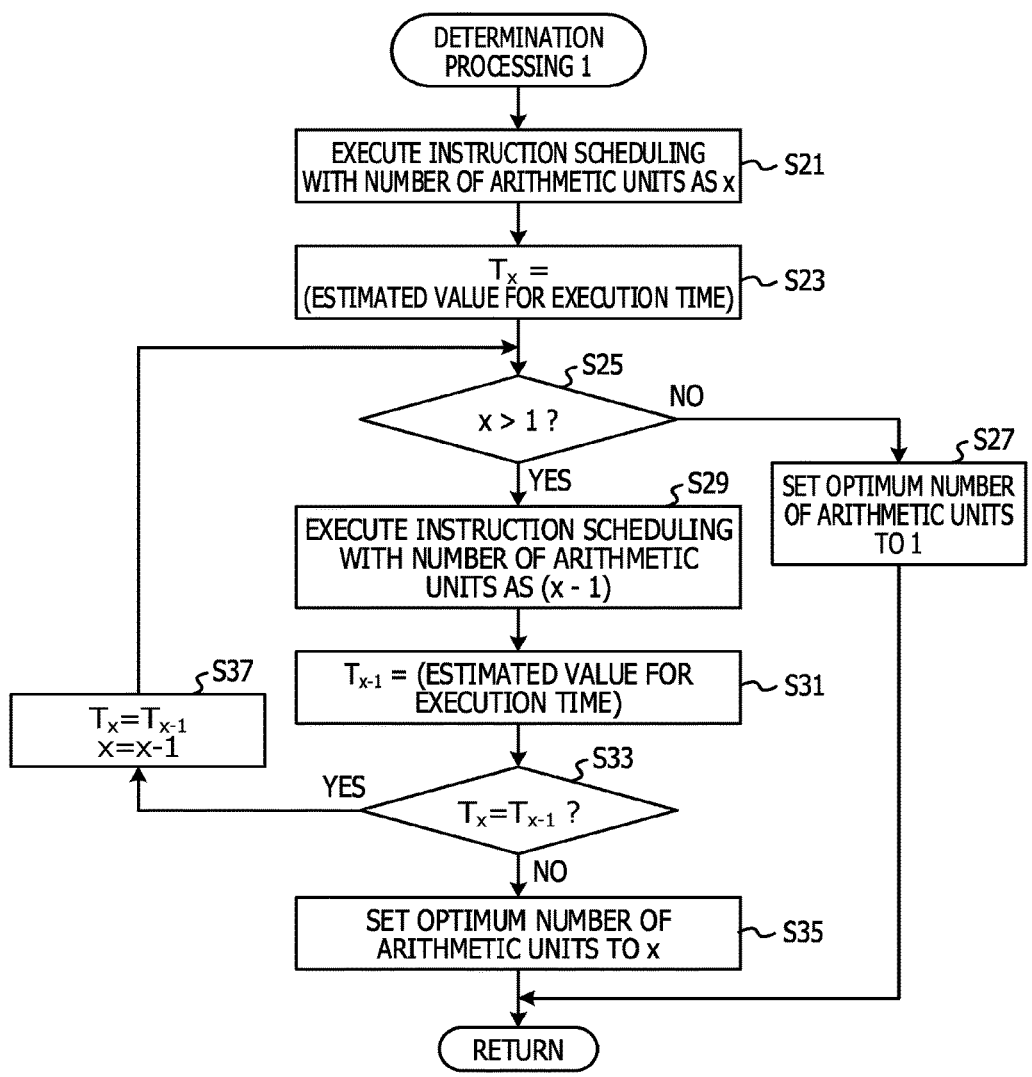
FIG. 6 illustrates a processing flow of a determination processing according to the first embodiment.

When the optimization state is not "impossible" (step S7: No), the determination unit 107 executes the determination processing for the target loop (step S11). The determination processing is described with reference to FIGS. 6 and 7. FIG. 6 illustrates a processing flow of the determination processing according to the first embodiment.

First, the instruction scheduling unit 104 executes instruction scheduling for the target loop with the number of arithmetic units as x (x is a natural number whose default value is the number of arithmetic units 132 in the information processing apparatus 1) (FIG. 6: step S21), and stores the execution result into the scheduling result storage unit 105. The instruction scheduling is executed by a method disclosed in, for example, "Ikuo Nakata, "Configuration and optimization of compiler", first impression of the first edition, Asakurashoten, 1999/9/20". Detailed description of the instruction scheduling is omitted here as it is a known technique.

FIG. 7 illustrates an example of the result of the instruction scheduling. In the example of FIG. 7, an instruction to a memory (or memory area), an instruction to another memory (or memory area), an instruction executed by an arithmetic unit and an instruction executed by another arithmetic unit are illustrated for each clock cycle. In this example, time used for execution of the target loop is 13 clock cycles, and time (or latency) used for execution of each instruction is 3 clock cycles. Instruction scheduling is performed based on such as a dependency relationship between each instruction and the latency of each instruction.

Note that the source program is converted to an intermediate representation program by the processing of the step S21 and stored into the scheduling result storage unit 105.

Referring back to the description of FIG. 6, the determination unit 107 sets an estimated value for execution time of the target loop calculated by the instruction scheduling to $T_x$ (step S23). In the example of FIG. 7, $T_x=13$.

The determination unit 107 determines whether x>1 is satisfied (step S25). When x>1 is not satisfied (or x=1) (step S25: No), the determination unit 107 sets "1" as an optimum number of arithmetic units for the target loop in the optimization table storage unit 106 (step S27). Then, the process returns to a caller processing.

Meanwhile, when x>1 is satisfied (step S25: Yes), the instruction scheduling unit 104 executes the instruction scheduling for the target loop with the number of arithmetic units as (x−1) (step S29) and stores the execution result into the scheduling result storage unit 105.

The determination unit 107 sets an estimated value for execution time of the target loop calculated by the instruction scheduling in the step S29 to $T_{x-1}$ (step S31).

The determination unit 107 determines whether $T_x=T_{x-1}$ is satisfied (step S33). In the step S33, the determination unit 107 may determine whether difference between $T_x$ and $T_{x-1}$ is less than the threshold value (or, $T_x-T_{x-1}$<threshold value α is satisfied).

When $T_x=T_{x-1}$ is satisfied (step S33: Yes), the determination unit 107 sets $T_x=T_{x-1}$ and x=x-1 (step S37). Then, the process returns to the processing of the step S25. Meanwhile, when $T_x=T_{x-1}$ is not satisfied (step S33: No), the determination unit 107 sets the optimum number of arithmetic units to x (step S35). Then, the process returns to a caller processing.

By executing the processings as described above, a minimum number of arithmetic units may be determined while prolongation of the execution time is suppressed.

Referring back to the description of FIG. 3, the determination unit 107 determines whether the optimum number of arithmetic units (hereinafter, assume that the optimum number of arithmetic units is n) determined in the step S11 is a maximum number of usable arithmetic units (or the number of arithmetic units 132 within the information processing apparatus 1) (step S13). When the number n of arithmetic units is a maximum number of usable arithmetic units (step S13: Yes), the determination unit 107 sets the optimization state of the target loop to "impossible" (step S15). Then, the process proceeds to the processing of the step S9.

Meanwhile, when the number n of arithmetic units is not a maximum number of usable arithmetic units (step S13: No), the determination unit 107 sets the optimization state of the target loop to "complete" (step S17), and stores, into the optimization table storage unit 106, data representing that the optimum number of arithmetic units for the target loop is "n".

The determination unit 107 determines whether there is an unprocessed loop (step S19). If there is an unprocessed loop (step S19: Yes), the process returns to the processing of the step S5. If there is no unprocessed loop (step S19: No), the process ends.

By executing the processing as described above, an optimum number of arithmetic units for an optimizable loop may be determined.

Figure 8:
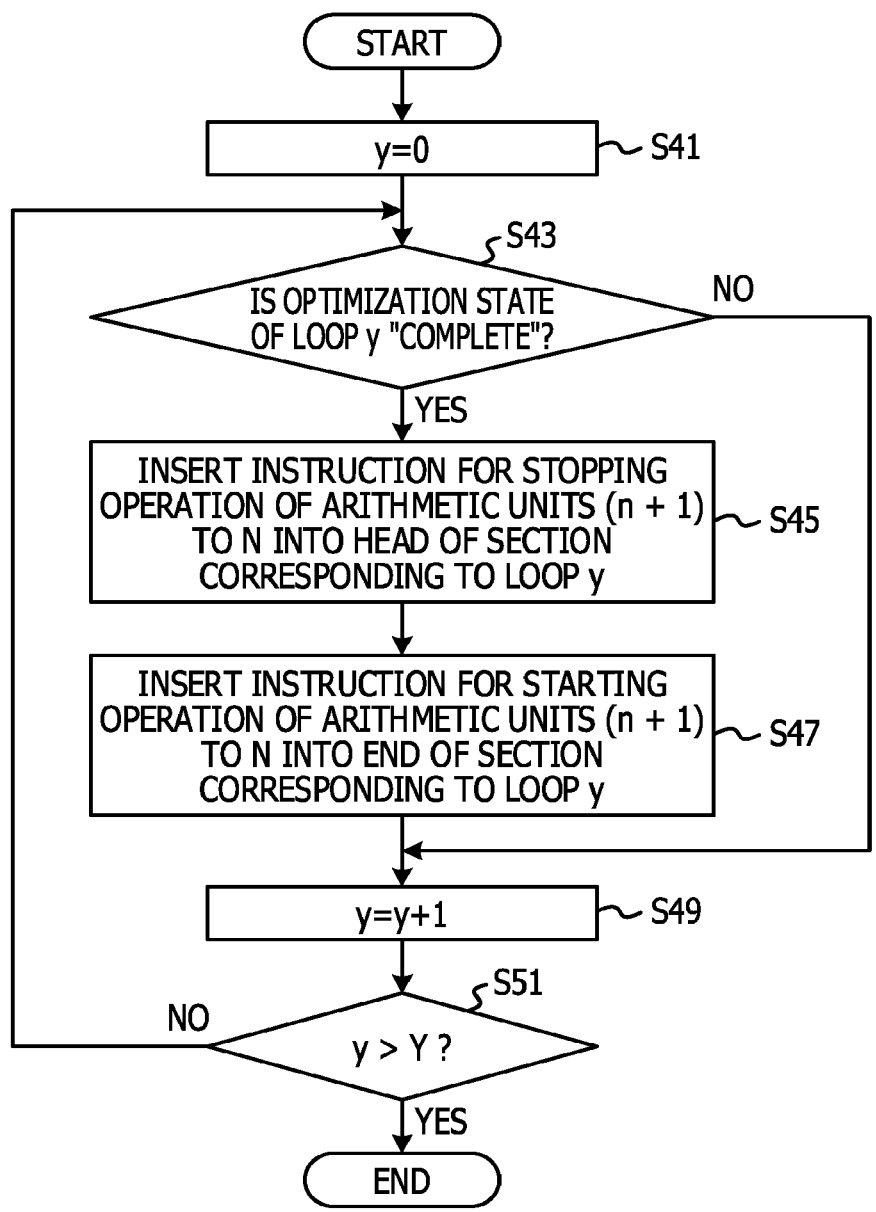
FIG. 8 illustrates a processing flow of a processing executed by an insertion unit.

Next, a processing executed by the insertion unit 108 is described with reference to FIG. 8. FIG. 8 illustrates a processing flow of the processing executed by the insertion unit.

First, the insertion unit 108 acquires an intermediate representation program stored in the scheduling result storage unit 105 via the determination unit 107. Then, the insertion unit 108 sets a variable y representing the loop identifier to y=0 (FIG. 8: step S41).

The insertion unit 108 determines whether the optimization state of the loop y is "complete" in the optimization table storage unit 106 (step S43). When the optimization state of the loop y is not "complete" (that is, "incomplete") (step S43: No), the process proceeds to the processing of the step S49.

Meanwhile, when the optimization state of the loop y is "complete" (step S43: Yes), the insertion unit 108 inserts an instruction for stopping operation of arithmetic units (n+1) to N (N is the number of arithmetic units 132 in the information processing apparatus 1) into the head of the section corresponding to the loop y on the source program (step S45). Here, n is the optimum number of arithmetic units determined in the step S11.

The insertion unit 108 inserts an instruction for starting operation of arithmetic units (n+1) to N (N is the number of arithmetic units 132 in the information processing apparatus 1) into an end of the section corresponding to the loop y on the source program (step S47).

The insertion unit 108 sets y=y+1 (step S49), and determines whether y>Y is satisfied (step S51). In this case, Y is a number obtained by subtracting 1 from the number of loops extracted from the source program. When y>Y is not satisfied (step S51: No), the process returns to the processing of the step S43. When y>Y is satisfied (step S51: Yes), the insertion unit 108 stores the processed program into the optimization program storage unit 109. Then, the process ends.

FIG. 9 illustrates an example of a program stored into the optimization program storage unit 109. In this case, assume that the number of integer arithmetic units is N, and any number of 1 to N is assigned to each integer arithmetic unit. Also, assume that the number of floating point arithmetic units is N, and any number of 1 to N is assigned to each floating point arithmetic unit. In the default state, all arithmetic units are in operation. An instruction for starting operation of an integer arithmetic unit assigned with a number "m" is, for example, "ExecUnit, On, m", and an instruction for stopping operation of the integer arithmetic unit assigned with the number "m" is, for example, "ExecUnit, Off, m". An instruction for starting operation of a floating point arithmetic unit assigned with a number "m" is, for example, "FexecUnit, On, m", and an instruction for stopping operation of the floating point arithmetic unit assigned with the number "m" is, for example, "FexecUnit, Off, m". In FIG. 9, "FexecUnit, Off, 2" is an instruction for stopping operation of a floating point arithmetic unit assigned with a number "2" is, and "FexecUnit, On, 2" is an instruction for starting operation of the floating point arithmetic unit assigned with the number "2".

By executing the processing as described above, prolongation of the execution time of the program may be suppressed, and power consumption may be reduced by reducing the number of arithmetic units.

[Second Embodiment]

In the first embodiment, the processing of determining the number of arithmetic units 132 based on the execution time is described. In a second embodiment, the processing of determining the number of arithmetic units 132 based on the execution time and power consumption is described.

Figure 10:
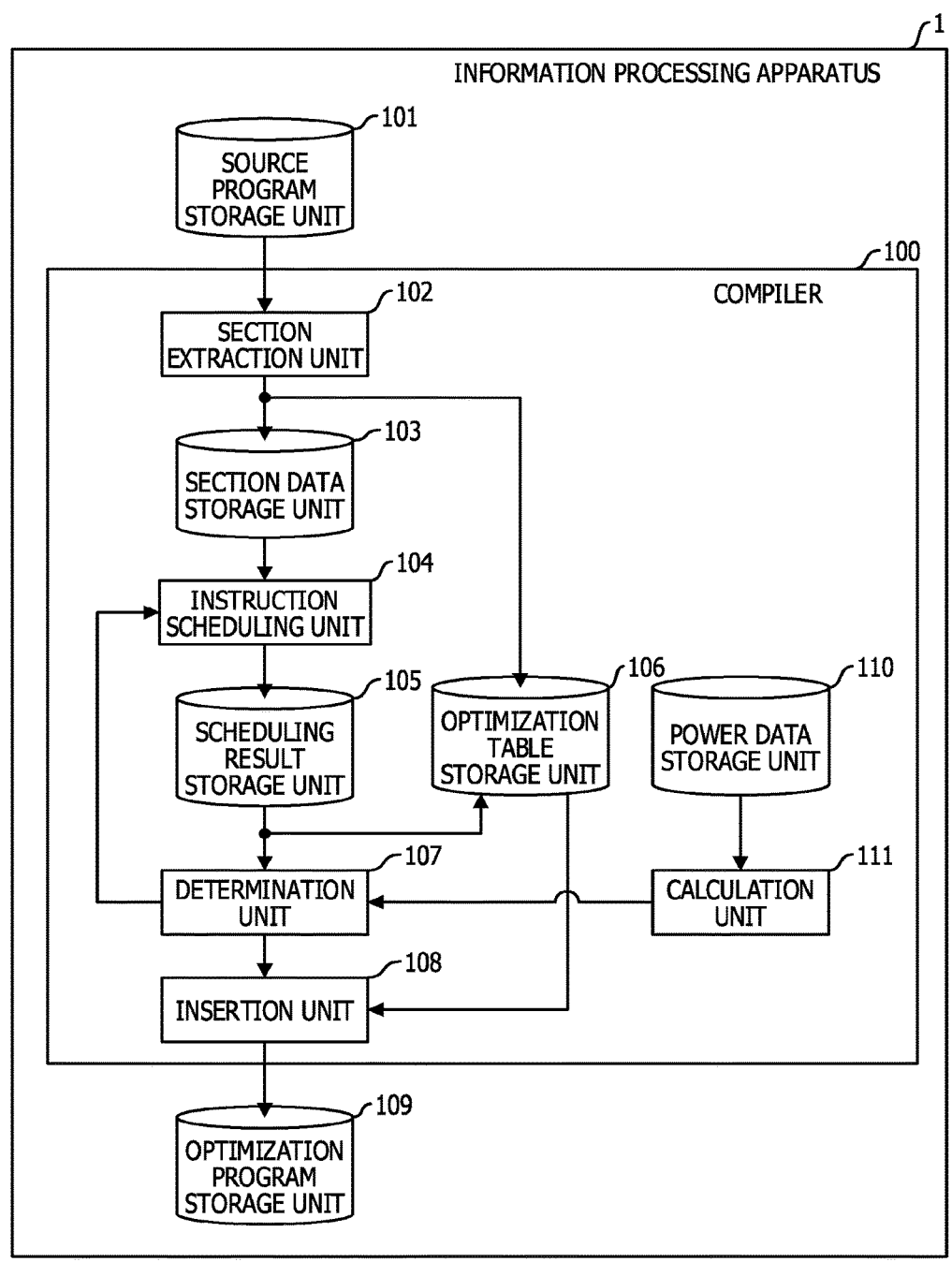
FIG. 10 illustrates a functional block diagram of an information processing apparatus according to a second embodiment.

FIG. 10 illustrates a functional block diagram of the information processing apparatus 1 according to the second embodiment. The information processing apparatus 1 includes a compiler 100, a source program storage unit 101 and an optimization program storage unit 109. The compiler 100 includes a section extraction unit 102, a section data storage unit 103, an instruction scheduling unit 104, a scheduling result storage unit 105, an optimization table storage unit 106, a determination unit 107, an insertion unit 108, a power data storage unit 110 and a calculation unit 111.

The source program storage unit 101 stores a source program to be compiled. The section extraction unit 102 executes a processing based on a source program stored in the source program storage unit 101 and stores the processing result into the section data storage unit 103 and the optimization table storage unit 106. The instruction scheduling unit 104 executes a processing based on data stored in the section data storage unit 103, and stores the processing result into the scheduling result storage unit 105. The calculation unit 111 executes a processing based on data stored in the power data storage unit 110, and notifies the determination unit 107 of the processing result. The determination unit 107 executes a processing based on data stored in the scheduling result storage unit 105 and data received from the calculation unit 111, and updates data stored in the optimization table storage unit 106 based on the processing result. The insertion unit 108 executes a processing based on data stored in the optimization table storage unit 106 and data received from the determination unit 107 and stores the processing result into the optimization program storage unit 109.

Figure 11:
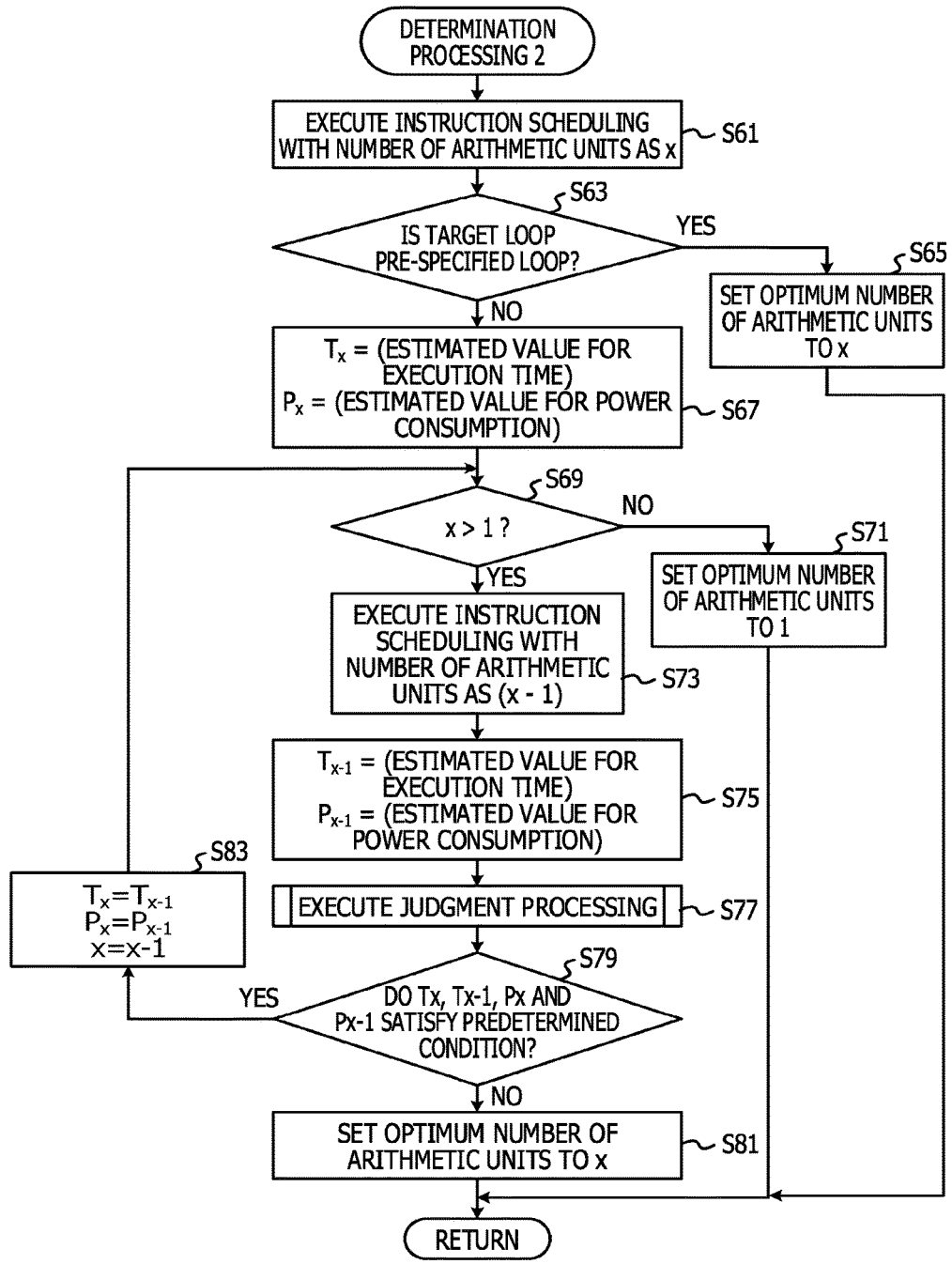
FIG. 11 illustrates a processing flow of a determination processing according to the second embodiment.
Figure 13:
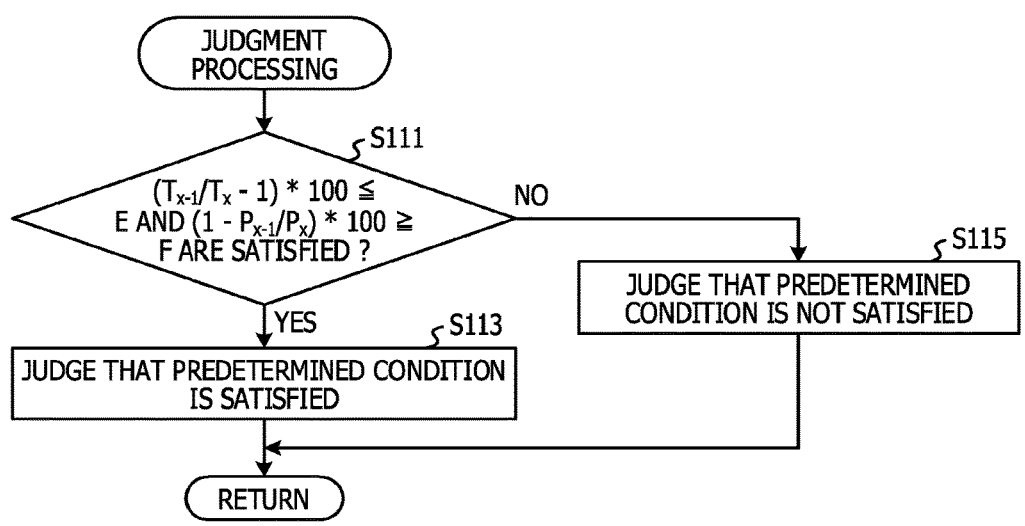
FIG. 13 illustrates a processing flow of a judgment processing.

Next, a determination processing in the second embodiment is described with reference to FIGS. 11 to 14. FIG. 11 illustrates a processing flow of the determination processing according to the second embodiment. FIG. 12 illustrates an example of data for specifying a loop which is given priority for performance. FIG. 13 illustrates a processing flow of the judgment processing. FIG. 14 illustrates an example of the threshold value of an increase rate and the threshold value of a decrease rate.

First, the instruction scheduling unit 104 performs instruction scheduling for the target loop with the number of arithmetic units as x (x is a natural number whose default value is the number of arithmetic units 132 in the information processing apparatus 1) (FIG. 11: step S61), and stores the execution result into the scheduling result storage unit 105. The instruction scheduling is executed by a method disclosed in, for example, "Ikuo Nakata, "Configuration and optimization of compiler", first impression of the first edition, Asakurashoten, 1999/9/20". Detailed description of the instruction scheduling is omitted here as it is a known technique.

Note that the source program is converted to an intermediate representation program by the processing of the step S61 and stored into the scheduling result storage unit 105.

The determination unit 107 determines whether the target loop is a pre-specified loop (step S63). When the target loop is a pre-specified loop, data as illustrated in FIG. 12 is stored in the head of the loop on the source program. In the example of FIG. 12, information of "!loop priority performance" is added to a first loop starting with "for (j=1; j<M; j++){". When this information is added, the loop is given priority for processing performance, and the optimum number of arithmetic units remains the default value of x.

When the target loop is a pre-specified loop (step S63: Yes), the determination unit 107 sets the optimum number of arithmetic units to x (step S65). Then, the process returns to the caller processing.

Meanwhile, when the target loop is not a pre-specified loop (step S63: No), the determination unit 107 sets the estimated value for execution time of the target loop calculated by instruction scheduling to $T_x$, and sets the estimated value for power consumption for x arithmetic units acquired from the calculation unit 111 to $P_x$ (step S67). In the example of FIG. 7, $T_x$=13. The processing of calculating the estimated value for a power consumption by the calculation unit 111 is described later.

The determination unit 107 determines whether x>1 is satisfied (step S69). When x>1 is not satisfied (or x=1) (step S69: No), the determination unit 107 sets the optimum number of arithmetic units to "1" (step S71). Then, the process returns to the caller processing.

Meanwhile, when x>1 is satisfied (step S69: Yes), the instruction scheduling unit 104 executes instruction scheduling for the target loop with the number of arithmetic units as (x−1) (step S73) and stores the execution result into the scheduling result storage unit 105.

The determination unit 107 sets $T_{x-1}$ to the estimated value for execution time of the target loop calculated by the instruction scheduling in the step S73, and sets the estimated value for power consumption of (x−1) arithmetic units acquired from the calculation unit 111 to $P_{x-1}$ (step S75).

The determination unit 107 executes the judgment processing (step S77). The judgment processing is described with reference to FIGS. 13 and 14.

The determination unit 107 determines whether $(T_{x-1}/T_x-1)*100 \leq E$ and $(1-P_{x-1}/P_x)*100 \geq F$ are satisfied (step S111). The formulas of the step S111 are formulas for judging whether the predetermined condition of the increase rate of the execution time is less than E% and the decrease rate of the power consumption is more than F% is satisfied. E and F are predetermined, for example, by the administrator. For example, as illustrated in FIG. 14, multiple power saving modes may be prepared, and the value may be changed over between E and F depending on the situation.

When $(T_{x-1}/T_x-1)*100 \leq E$ and $(1-P_{x-1}/P_x)*100 \geq F$ are satisfied (step S111: Yes), the determination unit 107 judges that $T_x$, $T_{x-1}$, $P_x$ and $P_{x-1}$ satisfy a predetermined condition (step S113). Meanwhile, when $(T_{x-1}/T_x-1)*100 \leq E$ and $(1-P_{x-1}/P_x)*100 \geq F$ are not satisfied (step S111: No), the determination unit 107 judges that $T_x$, $T_{x-1}$, $P_x$ and $P_{x-1}$ do not satisfy a predetermined condition (step S115). Then, the process returns to the caller processing.

Referring back to the description of FIG. 11, the determination unit 107 determines whether $T_x$, $T_{x-1}$, $P_x$ and $P_{x-1}$ satisfy a predetermined condition (step S79). When $T_x$, $T_{x-1}$, $P_x$ and $P_{x-1}$ satisfy a predetermined condition (step S79: Yes), the determination unit 107 sets $T_x=T_{x-1}$, $P_x=P_{x-1}$ and x=x−1 (step S83). Then, the process returns to the processing of the step S69.

Meanwhile, when $T_x$, $T_{x-1}$, $P_x$ and $P_{x-1}$ do not satisfy a predetermined condition (step S79: No), the determination unit 107 sets the optimum number of arithmetic units to x (step S81). Then, the process returns to the caller processing.

By executing the processing as described above, a minimum number of arithmetic units may be determined within a range where the execution time and power consumption satisfy the predetermined condition.

Figure 15:
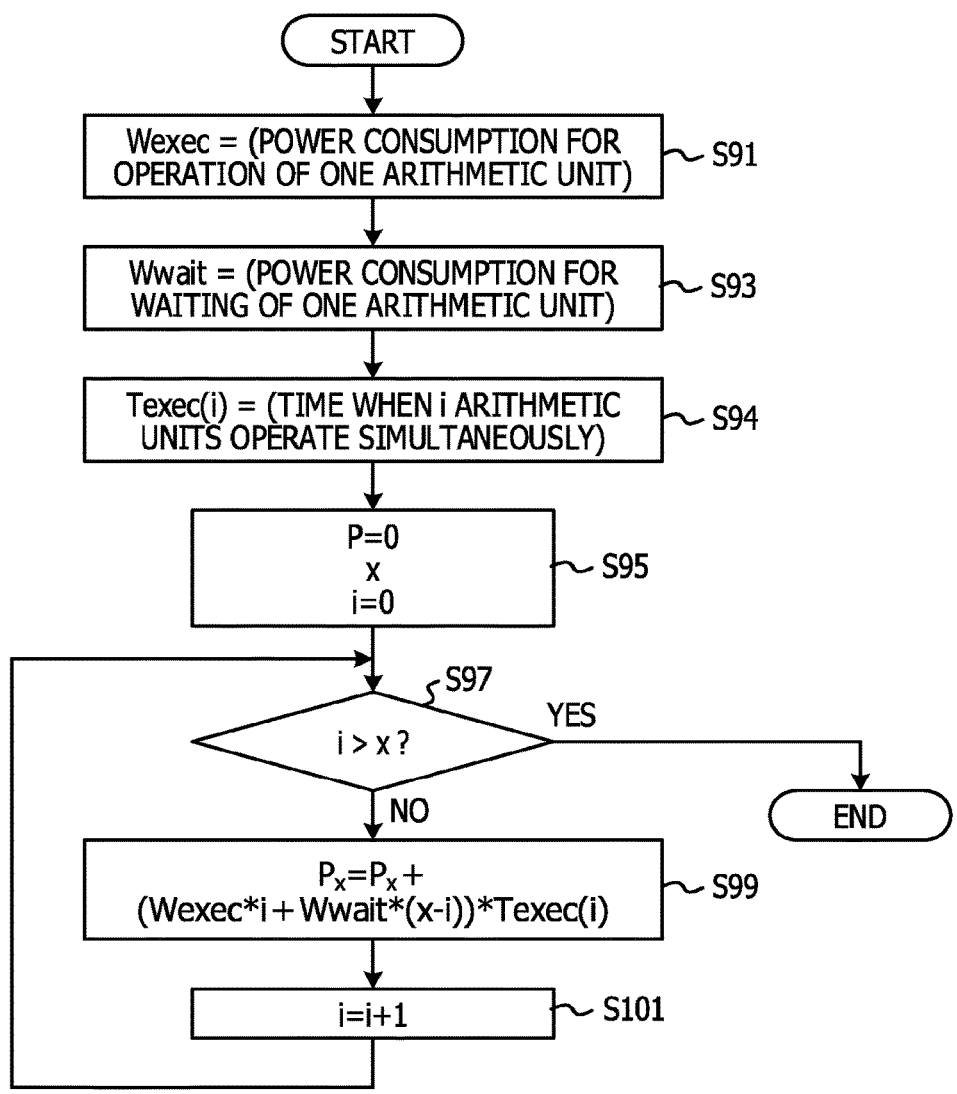
FIG. 15 illustrates a processing flow of a processing executed by a calculation unit.

Next, a processing executed by the calculation unit 111 is described with reference to FIG. 15. FIG. 15 illustrates a processing flow of a processing executed by the calculation unit 111.

First, the calculation unit 111 reads out data of power consumption for one arithmetic unit in operation from the power data storage unit 110, and sets the power consumption for one arithmetic unit in operation to Wexec (FIG. 15: step S91). Power consumption for one arithmetic unit in operation is measured, for example, by the administrator in advance.

The calculation unit 111 reads out data of power consumption for one arithmetic unit in waiting state from the power data storage unit 110, and sets the power consumption for one arithmetic unit in waiting state (step S93) to Wwait. Power consumption for one arithmetic unit in waiting state is measured, for example, by the administrator in advance.

The calculation unit 111 sets a duration (clock cycle) when i arithmetic units 132 operate simultaneously to Texec (i) (step S94). In this case, i is an integer satisfying $0 \leq i \leq x$. In this processing, x is a value specified by the determination unit 107.

The calculation unit 111 sets $P_x=0$ and i=0 (step S95). In this case, $P_x$ represents power consumption by x arithmetic units.

The calculation unit 111 determines whether i>x is satisfied (step S97). When i>x is satisfied (step S97: Yes), the calculation unit 111 notifies the determination unit 107 of $P_x$ (that is, estimated power consumption), and the process ends.

Meanwhile, when i>x is not satisfied (step S97: No), the calculation unit 111 sets $P_x=P_x+(Wexec*i+Wwait*(x-i))*Texec(i)$ (step S99). In this case, Texec(i) is a duration when i arithmetic units 132 operate simultaneously. For example, in the example of FIG. 7, $T(0)=4$ clock cycles, $T(1)=6$ clock cycles, and $T(2)=3$ clock cycles.

The calculation unit 111 sets i=i+1 (step S101). Then, the process returns to the processing of the step S97.

By executing the processing as described above, power consumption by x arithmetic units may be determined.

Figure 16:
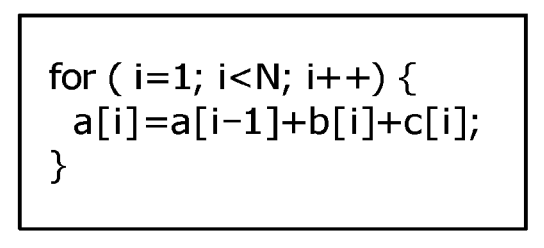

Hereinafter, two examples of the operation of the information processing apparatus 1 are provided. FIG. 16 illustrates an example of the source program. FIG. 17 illustrates an example of the scheduling result.

In a first example, the source program is the program illustrated in FIG. 16. Assume that the number of simultaneous accesses to the memory 12 is 2, the number of operated integer arithmetic units is 2, and the scheduling result when the number of operated floating point arithmetic units is 2 is the scheduling result illustrated in FIG. 17. Since there is a dependency relationship between a[i] and a[i−1], execution of the addition instruction in the same clock cycle is not possible.

In the scheduling result of FIG. 17, the execution time is 11 clock cycles, the number of used integer arithmetic units is 1, and the number of used floating point arithmetic units is 1. At that time, $T_2=11$ and $T_1=11$ are satisfied. Thus, since there is no change of the execution time even if the number of floating point arithmetic units is reduced by 1, the number of floating point arithmetic units may be reduced by 1. However, no more reduction of the number is possible. $T_2=11$ and $T_1=11$ are also satisfied for the integer arithmetic unit as well. Therefore, similarly with the floating point arithmetic unit, the number of integer arithmetic units may be reduced by 1.

Thus, power consumption may be reduced by reducing the number of floating point arithmetic units and the number of integer arithmetic units by 1 respectively.

Figure 18:
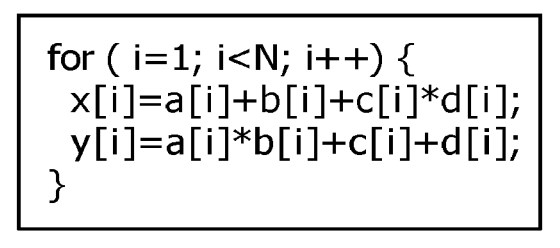

FIG. 18 illustrates an example of the source program. FIGS. 19 and 20 illustrate an example of the scheduling result. In the second example, the source program is a program illustrated in FIG. 18. Assume that the number of simultaneous accesses to the memory 12 is 2, the number of operated integer arithmetic units is 2, and the scheduling result when the number of operated floating point arithmetic units is 2 is the scheduling result illustrated in FIG. 19.

In the scheduling result of FIG. 19, the execution time is 17 clock cycles, the number of used integer arithmetic units is 1, and the number of used floating point arithmetic units is 2. That is, $T_2=17$.

Meanwhile, assume that the scheduling result when instruction scheduling is performed with the number of floating point arithmetic units as 1 is the scheduling result illustrated in FIG. 20. In this case, $T_1=23$. Thus, $T_2 \neq T_1$. Therefore, the number of floating point arithmetic units is not reduced.

Meanwhile, the number of integer arithmetic units may be reduced by 1. Therefore, power consumption is reduced by reducing the number of integer arithmetic units by 1 in the second example as well.

For the floating point arithmetic unit, $T_2=17$, $T_1=23$, $P_2=Wexec*19+Wwait*49$, and $P_1=Wexec*19+Wwait*27$. Therefore, when the number of floating point arithmetic units is reduced by 1, the execution time increases by 6 clock cycles with the increase rate of $6/17*100=35\%$. Power consumption decreases by Wwait*22 with the decrease rate of $Wwait*22/(Wexec*19+Wwait*49)*100(\%)$.

Therefore, when 35% increase rate of the execution time is not greater than the threshold value E, and the decrease rate $Wwait*22/(Wexec*19+Wwait*49)*100(\%)$ of the power consumption is not less than the threshold value F, the scheduling result corresponds to the number of floating point arithmetic units reduced by 1 is employed.

Although one embodiment of the present disclosure is described above, the present disclosure is not limited thereto. For example, the functional block configuration of the information processing apparatus 1 described above may be inconsistent with an actual program modular structure.

Also, the configuration of each table described above is just an example, and the table does not have to have the above configuration. Further, in a processing flow, the sequence of processings may be replaced if there is no change in the processing result. Further, processings may be executed in parallel.

The embodiments of the present disclosure described above are summarized below.

The compiling method according to this embodiment includes processings comprising: (A) determining a number of arithmetic units to be operated for each of multiple sections in a first code, and (B) adding an instruction for specifying the number of arithmetic units to be operated to each of multiple sections to create a second code.

Thus, the number of operated arithmetic units is kept from increasing uselessly, and thereby power consumption is suppressed.

In the processing of determining the number of arithmetic units described above, (a1) the number of arithmetic units to be operated may be determined based on the relation between the number of operated arithmetic units and execution time of the section. Thus, the number of arithmetic units is determined in view of the execution time.

In the processing of determining the number of arithmetic units described above, (a2) when execution time of the section with the number of operated arithmetic units smaller by 1 than a specific number is longer than execution time of the section with the specific number of operated arithmetic units, the specific number may be determined as the number of arithmetic units to be operated. Thus, execution time may not be prolonged, and power consumption is reduced.

In the processing of determining the number of arithmetic units described above, (a3) the number of arithmetic units to be operated may be determined based on the relation between the number of operated arithmetic units and execution time of the section, and the relation between the number of operated arithmetic units and power consumption. Thus, the number of arithmetic units is determined in view of the execution time and power consumption.

In the processing of determining the number of arithmetic units described above, (a4) when the ratio of execution time of the section with the specific number of operated arithmetic units with respect to execution time of the section with the number of arithmetic units smaller by 1 than the specific number is not greater than a first value, and the ratio of power consumption with the specific number of operated arithmetic units with respect to power consumption with the number of operated arithmetic units smaller by 1 than the specific number is not less than a second value, the specific number may be determined as the number of arithmetic units to be operated. Thus, an appropriate number of arithmetic units is determined with both the execution time and power consumption are taken in consideration.

The multiple sections described above may be sections other than pre-specified one or more sections. Thus, some sections may be excluded from the target of the processing.

An instruction for specifying the number of arithmetic units to be operated may include an instruction for starting or ending the operation. Thus, the number of arithmetic units to be operated is controlled in an appropriate manner.

A program for causing a processor to execute processings by the above method may be created, and the program may be stored, for example, in a computer readable storage medium or a storage device such as a flexible disk, a CD-ROM, an optical magnetic disk, a semiconductor memory, and a hard disk. Note that an intermediate processing result is temporarily stored in a storage device such as a main memory.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A method of compiling a first program to output a second program, the method comprising:
   detecting a plurality of sections from the first program on the basis of a depth-first search;
   generating an optimization table for optimizing a number of arithmetic processing units corresponding to the plurality of sections;
   determining, by a processor and according to the generated optimization table, the number of arithmetic processing units that are to be operated during execution of the second program, the number of arithmetic processing units being for each section of the plurality of sections in the first program; and
   creating, based on the number of arithmetic processing units, the second program by adding an instruction to each section of the plurality of sections, wherein
   the instruction specifies the number of arithmetic processing units to be operated for each section of the plurality of sections.

2. The method according to claim 1, wherein the determining determines the number of arithmetic processing units to be operated based on a relation between a number of operated arithmetic processing units and an execution time in each of the sections.

3. The method according to claim 2, wherein the determining determines a specific number as the number of arithmetic processing units to be operated when a second execution time of a section with the number of operated arithmetic processing units smaller by 1 than the specific number is longer than first execution time of the section with the specific number of operated arithmetic processing units.

4. The method according to claim 1, wherein the determining determines the number of arithmetic processing units to be operated based on
   a first relation between a number of operated arithmetic processing units and an execution time of a section, and
   a second relation between the number of operated arithmetic processing units and a power consumption.

5. The method according to claim 4, wherein the determining determines a specific number as the number of arithmetic processing units to be operated when
   a first ratio of a third execution time of the section with the number of operated arithmetic processing units smaller by 1 than the specific number with respect to a fourth execution time of the section with the specific number of operated arithmetic processing units is not greater than a first value, and
   a second ratio of a second power consumption with the number of operated arithmetic processing units smaller by 1 than the specific number with respect to a first power consumption with the specific number of operated arithmetic processing units is not less than a second value.

6. The method according to claim 1, wherein the plurality of sections are sections other than one or more sections in the first program.

7. The method according to claim 1, wherein the instruction includes a first instruction for starting an operation of the arithmetic processing units and a second instruction for ending the operation of the arithmetic processing units.

8. An apparatus, comprising:
   a memory; and
   a processor coupled to the memory and configured to compile a first program to output a second program by:
      detecting a plurality of sections from the first program on the basis of a depth-first search;
      generating an optimization table for optimizing a number of arithmetic processing units corresponding to the plurality of sections;
      determining, according to the generated optimization table, the number of arithmetic processing units that are to be operated during execution of the second program, the number of arithmetic processing units being for each section of the plurality of sections in the first program; and
      creating, based on the number of arithmetic processing units, the second program by adding an instruction to each section of the plurality of sections, wherein
   the instruction specifies the number of arithmetic processing units to be operated for each section of the plurality of sections.

9. The apparatus according to claim 8, wherein the processor is configured to determine the number of arithmetic processing units to be operated based on a relation between a number of operated arithmetic processing units and an execution time in each of the sections.

10. The apparatus according to claim 9, wherein the processor is configured to determine a specific number as the number of arithmetic processing units to be operated when second execution time of a section with the number of operated arithmetic processing units smaller by 1 than the specific number is longer than first execution time of the section with the specific number of operated arithmetic processing units.

11. The apparatus according to claim 8, wherein the processor is configured to determine the number of arithmetic processing units to be operated based on
    a first relation between a number of operated arithmetic processing units and execution time of a section, and
    a second relation between the number of operated arithmetic processing units and a power consumption.

12. The apparatus according to claim 8, wherein the plurality of sections are sections other than one or more sections in the first program.

13. The apparatus according to claim 8, wherein the instruction includes a first instruction for starting operation of the arithmetic processing units and a second instruction for ending the operation of the arithmetic processing units.

14. A non-transitory storage medium storing a program for causing a computer to execute a process compiling a first program to output a second program, the process comprising:
- detecting a plurality of sections from the first program on the basis of a depth-first search;
- generating an optimization table for optimizing a number of arithmetic processing units corresponding to the plurality of sections;
- determining, according to the generated optimization table, the number of arithmetic processing units that are to be operated during execution of the second program, the number of arithmetic processing units being for each section of the plurality of sections in the first program; and
- creating, based on the number of arithmetic processing units, the second program by adding an instruction to each section of the plurality of sections, wherein
- the instruction specifies the number of arithmetic processing units to be operated for each section of the plurality of sections.

15. The non-transitory storage medium according to claim 14, wherein the determining determines the number of arithmetic processing units to be operated based on a relation between a number of operated arithmetic processing units and an execution time in each of the sections.

16. The non-transitory storage medium according to claim 15, wherein the determining determines a specific number as the number of arithmetic processing units to be operated when second execution time of a section with the number of operated arithmetic processing units smaller by 1 than the specific number is longer than first execution time of the section with the specific number of operated arithmetic processing units.

17. The non-transitory storage medium according to claim 14, wherein the determining determines the number of arithmetic processing units to be operated based on
- a first relation between a number of operated arithmetic processing units and execution time of a section, and
- a second relation between the number of operated arithmetic processing units and power consumption.

18. The non-transitory storage medium according to claim 17, wherein the determining determines a specific number as the number of arithmetic processing units to be operated when
- a first ratio of a third execution time of the section with the number of operated arithmetic processing units smaller by 1 than the specific number with respect to a fourth execution time of the section with the specific number of operated arithmetic processing units is not greater than a first value, and
- a second ratio of a second power consumption with the number of operated arithmetic processing units smaller by 1 than the specific number with respect to a first power consumption with the specific number of operated arithmetic processing units is not less than a second value.

19. The non-transitory storage medium according to claim 14, wherein the plurality of sections are sections other than one or more sections in the first program.

20. The non-transitory storage medium according to claim 14, wherein the instruction includes a first instruction for starting operation of the arithmetic processing units and a second instruction for ending the operation of the arithmetic processing units.

* * * * *